(12) United States Patent
Soules et al.

(10) Patent No.: US 8,829,131 B2
(45) Date of Patent: Sep. 9, 2014

(54) FLUORINATED COPOLYMERS, MEMBRANES PREPARED USING THE LATTER AND FUEL CELL DEVICE INCLUDING SAID MEMBRANES

(75) Inventors: Aurélien Soules, Capestang (FR); Bruno Ameduri, Montpellier (FR); Bernard Boutevin, Montpellier (FR); Hervé Galiano, Joue les Tours (FR)

(73) Assignees: Commissariat a l'Energie Atomique et Aux Energies Alternatives, Paris (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 13/384,160

(22) PCT Filed: Jul. 13, 2010

(86) PCT No.: PCT/EP2010/060065
§ 371 (c)(1),
(2), (4) Date: Feb. 10, 2012

(87) PCT Pub. No.: WO2011/006894
PCT Pub. Date: Jan. 20, 2011

(65) Prior Publication Data
US 2012/0136077 A1 May 31, 2012

(30) Foreign Application Priority Data
Jul. 15, 2009 (FR) ...................................... 09 54889

(51) Int. Cl.
*C08F 214/18* (2006.01)
(52) U.S. Cl.
USPC .............................. 526/243; 521/27; 526/247
(58) Field of Classification Search
USPC ..................................... 526/243, 247; 521/27
See application file for complete search history.

(56) References Cited

U.S. PATENT DOCUMENTS

| 4,189,540 | A | * | 2/1980 | Seita et al. ...................... 521/27 |
| 5,798,417 | A | * | 8/1998 | Howard, Jr. ..................... 525/276 |
| 7,615,600 | B2 | * | 11/2009 | Capron et al. ................. 526/245 |
| 2012/0219878 | A1 | * | 8/2012 | Tayouo et al. ................. 429/482 |

FOREIGN PATENT DOCUMENTS

BE 793078 A1 6/1973

OTHER PUBLICATIONS

Webster's Ninth New Collegiate Dictionary, published by Merriam-Webster Inc., printed in 1986. See p. 1103.*
International Search Report issued on Aug. 20, 2010 for International Application No. PCT/EP2010/060065.

* cited by examiner

*Primary Examiner* — Peter D. Mulcahy
*Assistant Examiner* — Henry Hu
(74) *Attorney, Agent, or Firm* — Knobbe, Martens, Olson & Bear, LLP

(57) ABSTRACT

A fluorinated copolymer including at least one recurrent unit of the following formula (I):

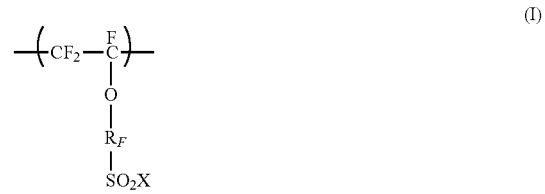

and at least one recurrent unit of the following formula (II):

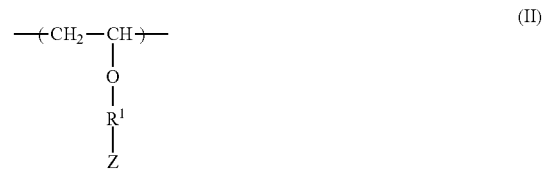

in which:
$R_F$ represents a perfluorocarbon chain optionally including one or more oxygen atoms;
X represents a halogen atom, OR with R representing a hydrogen atom or a cation;
$R^1$ represents a hydrocarbon chain or perfluorocarbon chain; and
Z represents a perfluorocarbon chain.

9 Claims, No Drawings

FLUORINATED COPOLYMERS, MEMBRANES PREPARED USING THE LATTER AND FUEL CELL DEVICE INCLUDING SAID MEMBRANES

RELATED APPLICATIONS

This application is a U.S. National Phase of International Application No.: PCT/EP2010/060065, filed Jul. 13, 2010, designating the U.S., and published in French as WO 2011/006894 on Jan. 20, 2011 which claims the benefit of French Patent Application No. 09 54889 filed Jul. 15, 2009.

TECHNICAL FIELD

The present invention relates to original fluorinated copolymers comprising inter alia, perflorinated units and to their preparation method.

These copolymers, having excellent physico-chemical capabilities, in particular high ion exchange capacities, in particular find application in the preparation of ion exchange membranes, intended for fuel cells.

Thus, the copolymers of the invention may find application in the design of ion exchange membranes intended for fuel cells, in particular fuel cells having a membrane as an electrolyte such as PEMFCs (meaning "Proton Exchange Membrane Fuel Cells") and DMFCs (meaning "Direct Methanol Fuel Cells").

BACKGROUND

Conventionally a fuel cell includes a stack of elementary cells within which takes place an electrochemical reaction between two reagents which are introduced continuously. The fuel, such as hydrogen, for fuel cells operating with hydrogen/oxygen mixtures (PEMFC) or with methanol for fuel cells operating with methanol/oxygen mixtures (DMFC), is brought into contact with the anode, while the oxidizer, generally oxygen, is brought into contact with the cathode. The anode and the cathode are separated by an electrolyte, of the ion exchange membrane type. The electrochemical reaction, the energy of which is converted into electrical energy, is divided into two half-reactions:

- oxidation of the fuel, taking place at the anode/electrolyte interface producing, in the case of hydrogen fuel cells, protons $H^+$, which will cross the electrolyte towards the cathode, and electrons which join the outer circuit, in order to contribute to the production of electrical energy;
- reduction of the oxidizer, taking place at the electrolyte/cathode interface, with production of water, in the case of hydrogen fuel cells.

The electrochemical reaction takes place at an electrode-membrane-electrode assembly.

The electrode-membrane-electrode assembly is a very thin assembly with a thickness of the order of 1 mm and each electrode is supplied with the combustible gases and oxidizer, for example by means of a fluted plate, a so called bipolar plate.

The ion conducting membrane is generally an organic membrane comprising ionic groups which, in the presence of water allow conduction of the protons produced at the anode by oxidation of hydrogen.

The most used commercial membranes today are membranes marketed under the brands of Nafion®, Flemion®, 3M®, Fumion® and Hyflon Ion® produced on an industrial scale.

In spite of the high attained conductivity values (for example, up to 100 mS/cm), the aforementioned membranes have the following major drawbacks:

- they are permeable to alcohols, in particular to methanol, which makes them incompatible with use in DMFC cells;
- they cannot be used under dry conditions, which prevents their use at temperatures above 85° C.;
- they have high cost.

The inventors have offered to develop novel copolymers which may be used for forming fuel cell membranes, which may have good proton conductivity compatible with the aforementioned use, which have hydrophobicity for preventing, when they are in the form of a membrane, diffusion of water or alcoholic solvents through the latter and which have thermal stability and chemical inertia.

DESCRIPTION OF CERTAIN INVENTIVE ASPECTS

Thus, the invention relates to fluorinated copolymers comprising at least one recurrent unit of the following formula (I):

and at least one recurrent unit of the following formula (II):

wherein:

$R_F$ represents a perfluorocarbon chain optionally comprising one or more oxygen atoms;

X represents a halogen atom or an OR group with R representing a hydrogen atom or a cation (such as Na, K);

$R^1$ represents a hydrocarbon chain or a perfluorocarbon chain;

Z represents a perfluorocarbon chain.

Before going into more details in the description, we propose the following definitions.

By hydrocarbon chain, is conventionally meant in the foregoing and in the following, a group comprising both carbon atoms and hydrogen atoms. For example, this may be an alkylene group comprising from 1 to 10 carbon atoms, such as an ethylene group —$CH_2$—$CH_2$—, notably for the group $R^1$.

By perfluorocarbon chain is conventionally meant in the foregoing and in the following, a group comprising both carbon atoms and fluorine atoms. For example, this may be a perfluoroalkyl group (notably for the group Z) comprising from 1 to 12 carbon atoms, such as a perfluorooctyl group. When the chain is divalent, i.e. placed between two other groups (this is the case of $R^1$ and $R_F$), this may be a perfluoroalkylene group, into which may be inserted one or more oxygen atoms, which may notably be the case for the group $R_F$.

By the simultaneous presence within the copolymers of at least one recurrent unit of formula (I) and of at least one recurrent unit of formula (II) the copolymers of the invention will adopt an original microstructure in the sense that the hydrophobic perfluorinated side groups will generate a separation of phases between the ionic <<clusters>> induced by the sulfonate or sulfonic acid groups and themselves.

The copolymers of the invention by the presence of fluorine, are also chemically stable and do not degrade, notably when they are placed under acid conditions. Thus, in an acid medium, because of the presence of the —$SO_2X$ groups, as defined earlier, these copolymers will be able to ensure circulation of protons between the different —$SO_2X$ groups of the copolymer, without their being any degradation of the backbone of the copolymer.

Furthermore, the presence of fluorinated groups gives hydrophobicity to the resulting copolymers making these copolymers not very permeable to water and to polar solvents such as alcoholic solvents, when these copolymers are put into the form of membranes.

According to the invention, $R_F$ may be a perfluorocarbon group comprising from 1 to 12 carbon atoms and comprising from 1 to 5 oxygen atoms.

Z may be a perfluorocarbon group comprising from 1 to 12 carbon atoms.

$R^1$ may be an alkylene group comprising from 1 to 5 carbon atoms, such as a group —$CH_2$—$CH_2$—.

X may be a fluorine atom or an —OH group.

The copolymers of the invention may comprise from 25 to 75% by moles of a recurrent unit of formula (I) and from 75 to 25% by moles of a recurrent unit of formula (II).

The molar mass of the copolymers of the invention may range from 2,000 to 100,000 g.mol$^{-1}$.

The copolymers of the invention may be random or alternating copolymers.

Among the copolymers in accordance with the present invention, mention may advantageously be made of the following particular copolymers:

the copolymer comprising as a recurrent unit according to formula (I) a recurrent unit of the following formula (Ia):

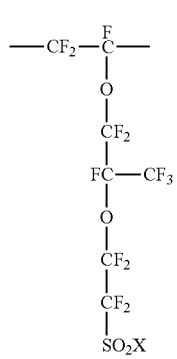

with X having the same definition as the one given earlier and as a recurrent unit according to formula (II), a recurrent unit of the following formula (IIa):

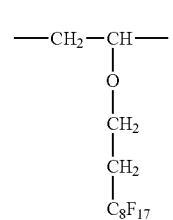

The copolymers of the invention may be obtained by a preparation method, in particular by a radical polymerization method comprising a polymerization step in the presence of a free radical initiator of at least one monomer of the following formula (III):

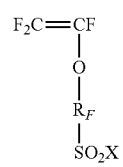

and of at least one monomer of the following formula (IV):

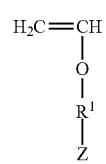

$R_F$, X, Z and $R^1$ being as defined above.

An efficient free radical initiator within the scope of this method may be selected from peroxypivalate derivates such as tert-butyl peroxypivalate (entitled TBPPi), peroxide derivatives such as ditertbutyl peroxide, sulfate derivatives such as sodium or ammonium persulfate.

The polymerization step is preferably carried out in an aprotic polar solvent, which may be selected from the following solvents:
dimethylformamide (DMF);
acetonitrile;
a halogenated solvent such as 1,1,2-trifluoro-1,2,2-trichloroethane, 1,1,1,3,3-pentafluoro-butane;
tetrahydrofurane;
water, and
mixtures thereof.

When X represents a halogen atom, the method of the invention may further include after the polymerization step, an acid hydrolysis step allowing transformation of the X groups into an OR function, R being as defined above.

After the polymerization step, the method of the invention may comprise a step for isolating the copolymer from the reaction medium, this isolation step may consist of adding to the reaction medium a precipitation solvent, such as cold pentane followed by filtration of the obtained precipitate.

The copolymers according to the invention, as mentioned earlier, have the particularity of having good chemical and mechanical stability notably at temperatures above 100° C.

Consequently, the object of the present invention is also a membrane comprising at least one copolymer as described above.

The membranes may be prepared in a standard way, for example by casting, i.e. the copolymer is put into solution in an adequate solvent, such as acetone, and then applied on a planar surface, such as a glass plate, by means of a device, such as a hand applicator.

The copolymer forming a humid film is then dried in order to form a film with an adequate thickness, for example from 15 to 150 μm, and then detached from the substrate.

Such membranes, notably when X represents —OH, have very high ion exchange capacity, greater than 1.5 meq.g$^{-1}$. Consequently, these membranes may notably be used for isolating the anodic and cathodic compartments of a fuel cell which may operate with the following systems:
  hydrogen, alcohols, such as methanol, at the anode;
  oxygen, air at the cathode.

Consequently, the object of the present invention is also a fuel cell device comprising at least one membrane as defined above.

In order to prepare such a device, the membrane is placed between two electrodes, for example in carbon fabric, optionally platinum-plated, and impregnated for example with copolymer according to the invention. The assembly is pressed by heating.

This assembly is then inserted between two plates (for example in graphite, called bipolar plates, which ensure distribution of the gases and electric conductivity).

The invention will now be described, with reference to the following examples, given as an indication and not as a limitation.

DETAILED DISCUSSION OF CERTAIN ILLUSTRATIVE EMBODIMENTS

In the following examples, the reagents below are used:
  tert-butyl peroxypivalate (designated below as TBPPi) used as a free radical initiator, was provided by Akzo Nobel;
  acetonitrile, 1,1,1,3,3-pentafluorobutane were distilled before use;
  sulfonyl perfluoro(4-methyl-3,6-dioxaoct-7-ene)-fluoride (PFVES) and 1H, 1H, 2H, 2H-perfluorodecyl vinyl ether (FAVE-8) were distilled before use;
  lithium carbonate $Li_2CO_3$ was used as such.

The analysis by $^1H$ NMR and $^{19}F$ NMR spectroscopy were carried out with a 400 MHz Bruker spectrometer with deuterated acetone as a solvent. The chemical displacements are defined in ppm relatively to trimethylsilane (TMS) for $^1H$ NMR and $CFCl_3$ for $^{19}F$ NMR. The experimental conditions for $^1H$ NMR (or $^{19}F$ NMR) are the following:
  pulse angle: 90° (or 30°);
  acquisition time: 4.5 s (or 0.7 s);
  pulse delay: 2 s (or 5 s);
  number of scans: 16 (or 64);
  pulse duration for $^{19}F$ NMR: 5 μs.

The Fourier transform IR spectrums were obtained with a Nicolet 510P Fourier spectrometer with an accuracy of ±2 cm$^{-1}$ by using a software package OMNIC®.

Differential scanning calorimetry (DSC) was carried out on a Perkins Elmer Pyris 1 apparatus connected to a microcomputer. The apparatus was calibrated with indium and n-octane. After its insertion into the apparatus, the sample was initially cooled to −105° C. for 15 minutes. Next, the second scan was carried out with a heating rate of 40° C.min$^{-1}$ up to 80° C., this temperature being maintained for 2 minutes. The assembly is then cooled to −105° C. at a rate of 320° C.min$^{-1}$ and left for 10 minutes at this temperature before the second scan performed at a heating rate of 20° C.min$^{-1}$. Finally, another heating cycle is applied and a third scan is performed at a heating temperature of 20° C.min$^{-1}$, in order to access the values of glassy transition temperatures (Tg).

Thermogravimetric analyses are performed on a Texas Instrument TGA 51-133 apparatus in air at a heating rate of 10° C.min$^1$ from room temperature up to 600° C.

EXAMPLE 1

This example illustrates the preparation of perfluorosulfonic membranes from the copolymerization of sulfonyl perfluoro(4-methyl-3,6-dioxaoct-7-ene)-fluoride (PFVES) monomers with 1H, 1H, 2H, 2H-perfluorodecyl vinyl ether (FAVE-8).

Said monomers respectively fit the following formulae:

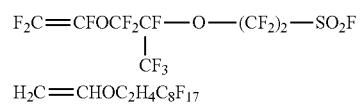

The aforementioned monomers are put into contact in a borosilicate carrier tube (length of 130 mm, inner diameter 10 mm, thickness of 2.5 mm and total volume of 8 cm$^3$). The tert-butyl peroxypivalate initiator (at a 1% content relatively to the amount of monomers) and acetonitrile are then introduced. The tube is cooled with liquid nitrogen connected to a vacuum line and purged several times by discharging the nitrogen. Next, the tube is sealed and immersed in liquid nitrogen and is then placed in a stirrer and heated to 75° C. for 12 hours. After reaction, the tube is cooled with liquid nitrogen, is opened and the obtained product is precipitated from cold acetone and then dried.

The operating conditions of the applied tests are listed in the table below:

| Test N° | TBPPi (mg) | FAVE-8 (g) | PFVES (g) | % mol of PFVES (in the reactor) | Acetonitrile (mL) |
|---|---|---|---|---|---|
| 1 | 17.2 | 2.0 | 0.2 | 10 | 5 |
| 2 | 19.3 | 2.0 | 0.5 | 20 | 4 |
| 3 | 22.1 | 2.0 | 0.8 | 30 | 5 |
| 4 | 25.8 | 2.0 | 1.2 | 40 | 3 |
| 5 | 28.1 | 2.0 | 1.5 | 45 | 5 |
| 6 | 34 | 2.2 | 2.0 | 50 | 6 |
| 7 | 30.9 | 1.8 | 2.0 | 55 | 5 |
| 8 | 28.4 | 1.5 | 2.0 | 60 | 7 |
| 9 | 26.1 | 1.2 | 2.0 | 65 | 5 |
| 10 | 24.3 | 0.9 | 2.0 | 70 | 4 |
| 11 | 21.2 | 0.5 | 2.0 | 80 | 5 |
| 12 | 18.9 | 0.2 | 2.0 | 90 | 6 |

The reaction scheme may be the following:

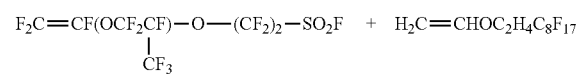

Copolymer comprising a recurrent unit of the following formula:

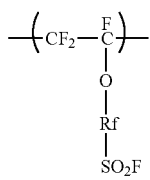

$Rf = CF_2CF(CF_3)OC_2F_4$ and a recurrent unit of the following formula:

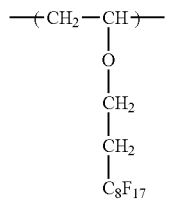

The obtained copolymers are analyzed by fluorine NMR spectroscopy ($^{19}F$ NMR), the results of this analysis being grouped in the table below:

| Chemical displacement (in ppm) | Associated chemical portion | Associated integral with the chemical displacement peak |
|---|---|---|
| 45 | —$SO_2F$ | $I_{+45}$ |
| −77 to −80 | —$OCF_2CF(C\underline{F_3})OCF_2CF_2SO_2F$ | $I_{-77}$ |
| −82 | —$(C\underline{F_2})_7$—$CF_3$ | $I_{-82}$ |
| −112 | —$OC\underline{F_2}CF(CF_3)OCF_2CF_2SO_2F$ | $I_{-112}$ |
| −114 | —$CF_2$—$(C\underline{F_2})_6$—$CF_3$ | $I_{-114}$ |
| −122 | —$C\underline{F_2}CF(OR_fSO_2F)$ | $I_{-122}$ |
| −122 à −127 | —$C\underline{F_2}$—$(CF_2)_6$—$CF_3$ | $I_{-127}$ |
| −125 | —$CF_2C\underline{F}(OR_FSO_2F)$ | $I_{-125}$ |
| −144 | —$OCF_2C\underline{F}(CF_3)OCF_2CF_2SO_2F$ | $I_{-144}$ |

The underlined fluorine atoms are those corresponding to the chemical displacements.

Thus, this table shows that the characteristic peaks are centered on the value +45 ppm which may be ascribed to the sulfonyl fluoride function of the PFVES unit. Other signals confirm the presence of a PFVES unit, in this case the signals ranging from −77 to −80 ppm, −112 ppm and −144 ppm which may be respectively ascribed to the fluorine atoms respectively present in the following groups: —$OCF_2CF(CF_3)OCF_2CF_2SO_2F$, —$OCF_2CF_2SO_2F$ and —$OCF_2CF(CF_3)OCF_2CF_2SO_2F$. Further, the signals centered on −82 and −114 ppm and located in the area ranging from −122 to −127 ppm correspond to the different fluorine atoms of the FAVE-8 units, —$(CF_2)_7$—$CF_3$, —$CF_2$—$(CF_2)_6$—$CF_3$, —$CF_2$—$(CF_2)_6$—$CF_3$, respectively.

The amount of monomeric units introduced into the copolymers was evaluated by using the following formulae, on the basis of the NMR fluorine spectrum:

Mol % of units from PFVES=$(I_A/I_A+I_B)*100$ (formula 1a)

Mol % of units from FAVE-8=$(I_B/I_B+I_A)*100$ (formula 1b)

with $I_A=(I_{+45}+I_{-77}+I_{-112}+I_{-144})/11$ $I_B=(I_{-82}+I_{-114}+I_{-127})/17$ For molar compositions of PFSVE in the reactor of 10, 20, 30, 40, 45, 50, 55, 60, 70, 80 and 90% molar respectively, copolymers are obtained including a molar % of units from PFVES or 25, 30, 40, 50, 50, 50, 50, 50, 60, 70 and 75, respectively.

It was observed that for initial PFVES contents in the reactor ranging from 40 to 65% molar, the resulting copolymers have an alternation of units from PFVES and from FAVE-8.

For the aforementioned tests, it was proceeded with the measurement of the glassy transition temperature (Tg) and with the measurement of the degradation temperature ($Td_{10}$) (under oxygen) (i.e. the temperature from which 10% by mass of the copolymer is degraded) respectively obtained by differential scanning calorimetry (DSC) and by thermogravimetric analysis (TGA).

The results appear in the table below.

| % of PFVES units in the copolymer (mol %) | Tg (° C.) | $Td_{10}$ (° C.) (under oxygen) |
|---|---|---|
| 25 | −26 | 267 |
| 30 | −20 | 320 |
| 40 | −20 | 375 |
| 50 | −20 | 420 |
| 50 | −20 | 420 |
| 50 | −20 | 420 |
| 50 | −20 | 420 |
| 50 | −20 | 420 |
| 60 | −22 | 280 |
| 70 | −24 | 255 |
| 75 | −28 | 243 |

It ensues that the obtained copolymers have very low transition temperatures, notably when the content of PFVES units is very high (notably Tg=−28° C. for a content of 75%).

This may be ascribed to the presence of pendant groups comprising 2 oxygen atoms in the PFVES units and only one in the FAVE-8 units.

Very high $Td_{10}$ values result, which makes these copolymers interesting with view to their being used in fuel cells, in particular for % values of PFVES units ranging from 40 to 50% where $Td_{10}$ is equal to 420° C.

EXAMPLE 2

This example illustrates the preparation of a copolymer, the sulfonyl chloride function of which is hydrolyzed into a sulfonate function from a copolymer prepared according to Example 1 (test for which the obtained copolymer comprises 25% by moles of units derived from PFVES).

2 g of copolymer are placed in a 50 mL beaker and stirred with 30 mL of 1,1,1,3,3-pentafluoro-butane. To this solution, 20 mL of a solution comprising $Li_2CO_3$ (2.5 eq.) in methanol (0.5 mol.$L^{-1}$) is added dropwise.

After addition, the solution is stirred at room temperature for 12 hours.

The, the solution is filtered and the solvents are removed. The residue is dried at room temperature under 20 mm of Hg for 48 hours.

The obtained copolymer is analysed by $^{19}F$ NMR spectroscopy. The observed chemical displacements confirm transformation of the sulfonyl chloride into a sulfonic group, which are the following:

a displacement of the multiplet from −112 ppm to −118.5 ppm assigned to the difluoromethylene group adjacent to the sulfonate group ($SO_3Li$), the other displacements remaining unchanged;

the absence of a peak at +45.3 ppm, characteristic of a sulfonyl fluoride group thereby confirming the quantitative hydrolysis reaction.

Le copolymer was also analysed by IR spectroscopy, which shows the presence of peaks at 3,500 and 1,050 cm$^{-1}$ which may be ascribed to elongational vibrations of the sulfonic acid function. The absorption frequencies centred on 1460-1470 cm$^{-1}$ and 810-820 cm$^{-1}$ characteristic of the vibrations of the sulfonyl chloride group have disappeared.

What is claimed is:

1. A linear, random or alternating fluorinated copolymer comprising:

at least one recurrent unit of the following formula (I) in a skeleton of the linear, random or alternating fluorinated copolymer:

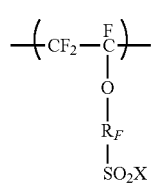

(I)

and at least one recurrent unit of the following formula (II) in the skeleton of the linear, random or alternating fluorinated copolymer:

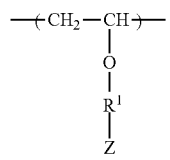

(II)

wherein:

$R_F$ represents a perfluorocarbon chain optionally comprising one or more oxygen atoms;

X represents a halogen atom or an OY group with Y representing a hydrogen atom or a cation;

$R^1$ represents a hydrocarbon chain;

Z represents a perfluorocarbon chain.

2. The copolymer according to claim 1, wherein $R_F$ is a perfluorocarbon group comprising from 1 to 12 carbon atoms and comprising from 1 to 5 oxygen atoms.

3. The copolymer according to claim 1, wherein Z is a perfluorocarbon group comprising from 1 to 12 carbon atoms.

4. The copolymer according to claim 1, wherein $R^1$ is an alkylene group comprising from 1 to 5 carbon atoms.

5. The copolymer according to claim 1, wherein X is a fluorine atom or an —OH group.

6. The copolymer according to claim 1, comprising as a recurrent unit compliant with formula (I), a recurrent unit of the following formula (Ia):

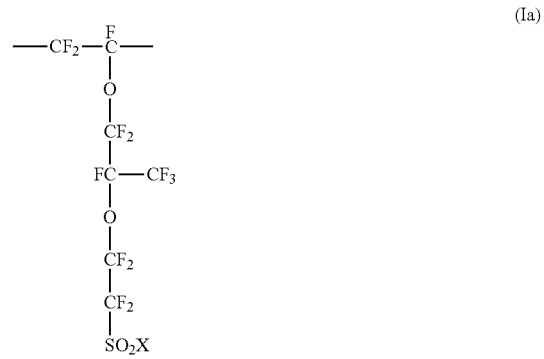

(Ia)

with X having the same definition as the one given in claim 1 and as a recurrent unit compliant with formula (II), a recurrent unit of the following formula (IIa):

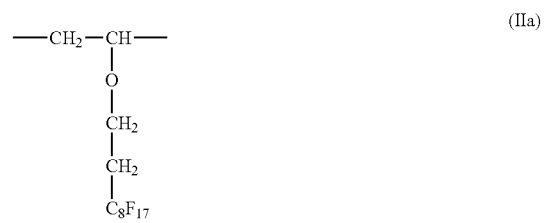

(IIa)

7. A method for preparing a copolymer as defined according to claim 1, comprising polymerizing at least one monomer of the following formula (III) in the presence of a free radical initiator:

(III)

and of at least one monomer of the following formula (IV):

(IV)

$R_F$, X, Z and $R^1$ being as defined in claim 1.

8. A membrane comprising at least one copolymer as defined according to claim 1.

9. A fuel cell device comprising at least one membrane as defined according to claim 8.

* * * * *